(12) United States Patent
Takado et al.

(10) Patent No.: US 10,645,325 B2
(45) Date of Patent: May 5, 2020

(54) SOLID-STATE IMAGING DEVICE, METHOD OF DRIVING SOLID-STATE IMAGING DEVICE, AND IMAGING SYSTEM HAVING DETECTION PIXELS AND IMAGE ACQUISITION PIXELS

(71) Applicant: CANON KABUSHIKI KAISHA, Tokyo (JP)

(72) Inventors: Hisashi Takado, Kawasaki (JP); Yasushi Iwakura, Kawaguchi (JP); Tetsuya Itano, Sagamihara (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/704,979

(22) Filed: Sep. 14, 2017

(65) Prior Publication Data

US 2018/0098012 A1   Apr. 5, 2018

(30) Foreign Application Priority Data

Sep. 30, 2016  (JP) .................................. 2016-194564

(51) Int. Cl.
*H04N 5/335* (2011.01)
*H04N 5/378* (2011.01)
(Continued)

(52) U.S. Cl.
CPC .......... *H04N 5/378* (2013.01); *H04N 5/3577* (2013.01); *H04N 5/367* (2013.01); *H04N 5/3675* (2013.01); *H04N 5/3696* (2013.01); *H04N 5/374* (2013.01); *H04N 5/3765* (2013.01); *H04N 5/37457* (2013.01)

(58) Field of Classification Search
CPC .................................................... H04N 5/3696
See application file for complete search history.

(56) References Cited

U.S. PATENT DOCUMENTS 6,958,775 B1  10/2005  Shinotsuka et al. .......... 348/302
7,126,102 B2  10/2006  Inoue et al. ............... 250/214 R
(Continued)

FOREIGN PATENT DOCUMENTS

CN   101729805   6/2010
EP   1 881 699   1/2008
(Continued)

OTHER PUBLICATIONS

Japanese Office Action dated Aug. 2, 2018 during prosecution of related Japanese application No. 2016-194564. (Whole English-language machine translation included.).

(Continued)

*Primary Examiner* — Gary C Vieaux
(74) *Attorney, Agent, or Firm* — Venable LLP

(57) ABSTRACT

A solid-state imaging device includes a first detection pixel and a second detection pixel, each of the first detection pixel and the second detection pixel including a transfer transistor and an amplifier transistor connected to the transfer transistor via a first node, a voltage supply unit that supplies a predetermined voltage, and a connection switch connected between the voltage supply unit and a second node at which the transfer transistor of the first detection pixel and the transfer transistor of the second detection pixel are connected.

17 Claims, 9 Drawing Sheets

(51) Int. Cl.
*H04N 5/367* (2011.01)
*H04N 5/369* (2011.01)
*H04N 5/374* (2011.01)
*H04N 5/357* (2011.01)
*H04N 5/3745* (2011.01)
*H04N 5/376* (2011.01)

(56) References Cited

U.S. PATENT DOCUMENTS

| | | | |
|---|---|---|---|
| 7,321,110 B2 | 1/2008 | Okita et al. | 250/208.1 |
| 7,385,172 B2 | 6/2008 | Inoue et al. | 250/214 R |
| 7,408,210 B2 | 8/2008 | Ogura et al. | 257/233 |
| 7,460,162 B2 | 12/2008 | Koizumi et al. | 348/294 |
| 7,462,810 B2 | 12/2008 | Kobayashi et al. | 250/208.1 |
| 7,550,793 B2 | 6/2009 | Itano et al. | 257/239 |
| 7,592,579 B2 | 9/2009 | Tamura et al. | 250/208.1 |
| 7,709,780 B2 | 5/2010 | Inoue et al. | 250/214.1 |
| 7,719,587 B2 | 5/2010 | Ogura et al. | 348/302 |
| 7,741,593 B2 | 6/2010 | Iwata et al. | 250/214 R |
| 7,825,974 B2 | 11/2010 | Itano et al. | 348/308 |
| 7,920,192 B2 | 4/2011 | Watanabe et al. | 348/308 |
| 7,978,241 B2 | 7/2011 | Koizumi et al. | 348/294 |
| 7,982,789 B2 | 7/2011 | Watanabe et al. | 348/308 |
| 8,023,025 B2 | 9/2011 | Itano et al. | 348/308 |
| 8,063,351 B2 | 11/2011 | Kobayashi et al. | 250/208.1 |
| 8,063,958 B2 | 11/2011 | Okita et al. | 348/241 |
| 8,063,967 B2 | 11/2011 | Itano et al. | 348/308 |
| 8,081,245 B2 | 12/2011 | Itano et al. | 348/301 |
| 8,085,319 B2 | 12/2011 | Ono et al. | 348/241 |
| 8,159,577 B2 | 4/2012 | Iwata et al. | 348/296 |
| 8,289,431 B2 | 10/2012 | Itano | 348/308 |
| 8,355,066 B2 | 1/2013 | Iwata et al. | 348/296 |
| 8,363,137 B2 | 1/2013 | Sonoda et al. | 348/302 |
| 8,368,790 B2 | 2/2013 | Itano et al. | 348/301 |
| 8,390,708 B2 | 3/2013 | Koizumi et al. | 348/294 |
| 8,400,546 B2 | 3/2013 | Itano et al. | 348/308 |
| 8,411,187 B2 | 4/2013 | Watanabe et al. | 348/308 |
| 8,441,558 B2 | 5/2013 | Okita et al. | 348/241 |
| 8,598,901 B2 | 12/2013 | Hiyama et al. | 324/750.3 |
| 8,670,049 B2 | 3/2014 | Ono et al. | 348/241 |
| 8,698,935 B2 | 4/2014 | Okita et al. | 348/314 |
| 8,711,259 B2 | 4/2014 | Maehashi et al. | 348/294 |
| 8,749,675 B2 | 6/2014 | Koizumi et al. | 348/294 |
| 8,836,838 B2 | 9/2014 | Nakamura et al. | 348/308 |
| 8,896,029 B2 | 11/2014 | Koizumi et al. | 257/202 |
| 8,928,786 B2 | 1/2015 | Iwata et al. | 348/294 |
| 9,029,752 B2 | 5/2015 | Saito et al. | 250/208.1 |
| 9,083,906 B2 | 7/2015 | Nakamura et al. | G02F 7/00 |
| 9,232,165 B2 | 1/2016 | Saito et al. | H03M 1/08 |
| 9,288,415 B2 | 3/2016 | Yamazaki et al. | H04N 5/363 |
| 9,438,828 B2 | 9/2016 | Itano et al. | H04N 5/35554 |
| 9,438,841 B2 | 9/2016 | Yamazaki et al. H04N 5/37455 |  |
| 9,602,752 B2 | 3/2017 | Kobayashi et al. H01L 27/14603 | |
| 9,825,077 B2 | 11/2017 | Watanabe et al. H01L 27/14616 | |
| 2007/0138375 A1* | 6/2007 | Lee | H01L 27/14609 250/214 R |
| 2009/0066793 A1* | 3/2009 | Takeda | H04N 17/002 348/148 |
| 2011/0003426 A1 | 1/2011 | Watanabe et al. | 438/73 |
| 2013/0002916 A1 | 1/2013 | Itano | 348/302 |
| 2015/0122975 A1 | 5/2015 | Saito et al. | 250/208.1 |
| 2015/0136952 A1 | 5/2015 | Kimura | |
| 2016/0022117 A1 | 1/2016 | Akahane | |
| 2016/0112663 A1 | 4/2016 | Takado | H04N 5/3535 |
| 2016/0173796 A1 | 6/2016 | Takado | H04N 5/23241 |
| 2016/0182839 A1 | 6/2016 | Shigeta et al. | H04N 5/35554 |
| 2016/0227141 A1 | 8/2016 | Kobayashi et al. | H04N 5/345 |
| 2016/0330414 A1 | 11/2016 | Takado et al. | H04N 2209/045 |
| 2016/0344956 A1 | 11/2016 | Takado et al. | H04N 5/23229 |
| 2017/0257605 A1 | 9/2017 | Iwakura et al. | H01L 27/14607 |
| 2017/0295335 A1* | 10/2017 | Kim | H01L 27/14612 |

FOREIGN PATENT DOCUMENTS

| | | |
|---|---|---|
| EP | 2 682 929 | 1/2014 |
| JP | 2001-145024 | 5/2001 |
| JP | 2005-065184 | 3/2005 |
| JP | 2007-174655 | 7/2007 |
| JP | 2010-245891 | 10/2010 |
| WO | 2006/120815 | 11/2006 |

OTHER PUBLICATIONS

U.S. Appl. No. 15/711,105, filed Sep. 21, 2017.
European Search Report dated Feb. 21, 2018 during prosecution of related European application No. 17192026.7.
European Office Action dated Nov. 22, 2019 during prosecution of related European application No. 17192026.7.
Chinese Office Action dated Oct. 11, 2019 during prosecution of related Chinese application No. 201710888017.9. (English-language machine translation included).

* cited by examiner

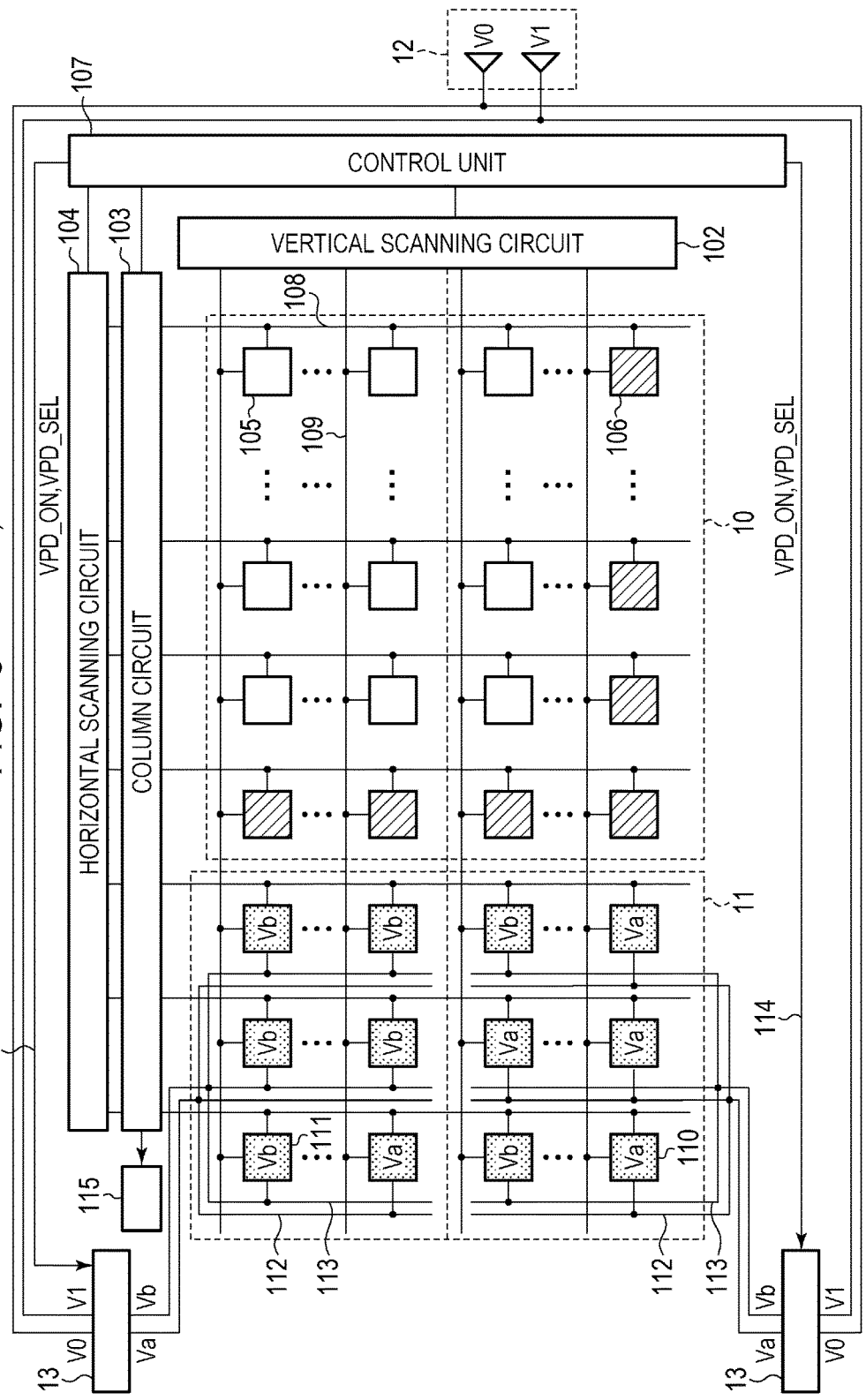

| VPD_ON | VPD_SEL | Va | Vb |
|--------|---------|-------|-------|
| 0 | 0 | Float | Float |
| 0 | 1 | Float | Float |
| 1 | 0 | V0 | V1 |
| 1 | 1 | V1 | V0 |

FIG. 7B
FRONT VIEW
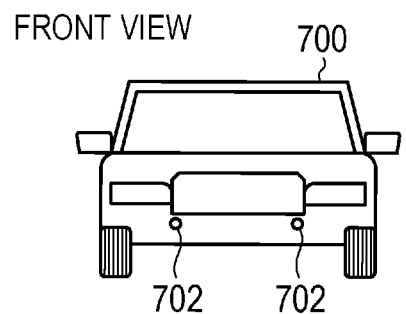
TOP VIEW
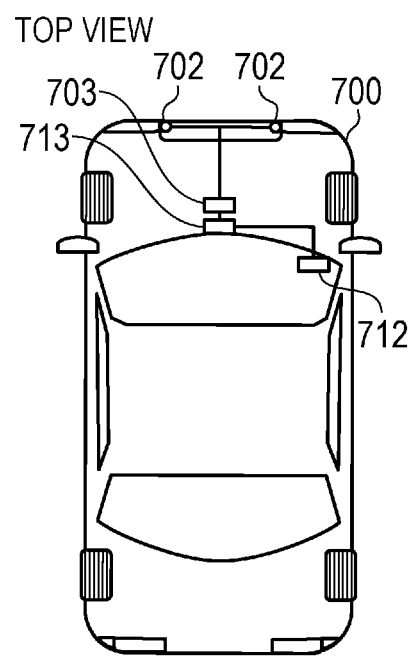
BACKSIDE VIEW
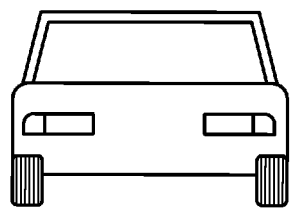

SOLID-STATE IMAGING DEVICE, METHOD OF DRIVING SOLID-STATE IMAGING DEVICE, AND IMAGING SYSTEM HAVING DETECTION PIXELS AND IMAGE ACQUISITION PIXELS

BACKGROUND OF THE INVENTION

Field of the Invention

The present invention relates to a solid-state imaging device, a method of driving the solid-state imaging device, and an imaging system.

Description of the Related Art

In recent years, there is a demand for reduction in size and improvement of reliability of a solid-state imaging device. In particular, the safety measure is quite important in on-vehicle applications under a severe operating environment and, for a functional safety, there is a demand for an imaging system with a failure detection function. To address this, it is required to embed a mechanism for failure detection also in a solid-state imaging device.

International Publication No. WO2006/120815 discloses, as a solid-state imaging device having means for failure detection, a solid-state imaging device configured such that means for generating a reference signal is provided in addition to a photoelectric converter in each pixel to output the reference signal. When the level of the output reference signal is compared to an expected value and the comparison result is out of the expected range, it can be determined that the solid-state imaging device is malfunctioning.

Reset operations of nodes may be performed in parallel on a pixel in which charges obtained by photoelectric conversion are input to the node via a transfer transistor and on a pixel in which a predetermined voltage is input to the node via a transfer transistor. In the solid-state imaging device disclosed in International Publication No. WO2006/120815, however, there is no consideration for the relationship between the reset operations of the node and the operation for inputting a predetermined voltage to the node in the above case.

SUMMARY OF THE INVENTION

The present invention intends to improve the accuracy of failure detection in a solid-state imaging device and an imaging system that can detect a failure while performing capturing.

According to one aspect of the present invention, there is provided a solid-state imaging device including a first detection pixel and a second detection pixel, each of the first and second detection pixels including a transfer transistor and an amplifier transistor connected to the transfer transistor via a first node, a voltage supply unit that supplies a predetermined voltage, and a connection switch connected between the voltage supply unit and a second node at which the transfer transistor of the first detection pixel and the transfer transistor of the second detection pixel are connected.

According to further another aspect of the present invention, there is provided a method of driving a solid-state imaging device including a voltage supply unit that supplies a predetermined voltage, a first detection pixel, a second detection pixel, and a control line, wherein the first detection pixel includes a photoelectric converter, a first transfer transistor connected to the photoelectric converter, and a first reset transistor connected to the first transfer transistor, wherein the second detection pixel includes a second transfer transistor and a second reset transistor connected to the second transfer transistor, and wherein the control line is connected to a gate of the first transfer transistor and a gate of the second transfer transistor, the method including setting an electrical path between the voltage supply unit and the second transfer transistor to be non-conductive in at least a part of a period in which the control line has a potential that causes both of the first transfer transistor and the first reset transistor to be turned on.

Further features of the present invention will become apparent from the following description of exemplary embodiments with reference to the attached drawings.

BRIEF DESCRIPTION OF THE DRAWINGS

FIG. 5 is a block diagram illustrating a general configuration of a solid-state imaging device according to a third embodiment of the present invention.

FIG. 7B is a schematic diagram illustrating an example configuration of a movable object according to the fourth embodiment of the present invention.

DESCRIPTION OF THE EMBODIMENTS

Preferred embodiments of the present invention will now be described in detail in accordance with the accompanying drawings.

First Embodiment

A solid-state imaging device and a method of driving the same according to a first embodiment of the present invention will be described by using FIG. 1 to FIG. 3B.

Figure 1:
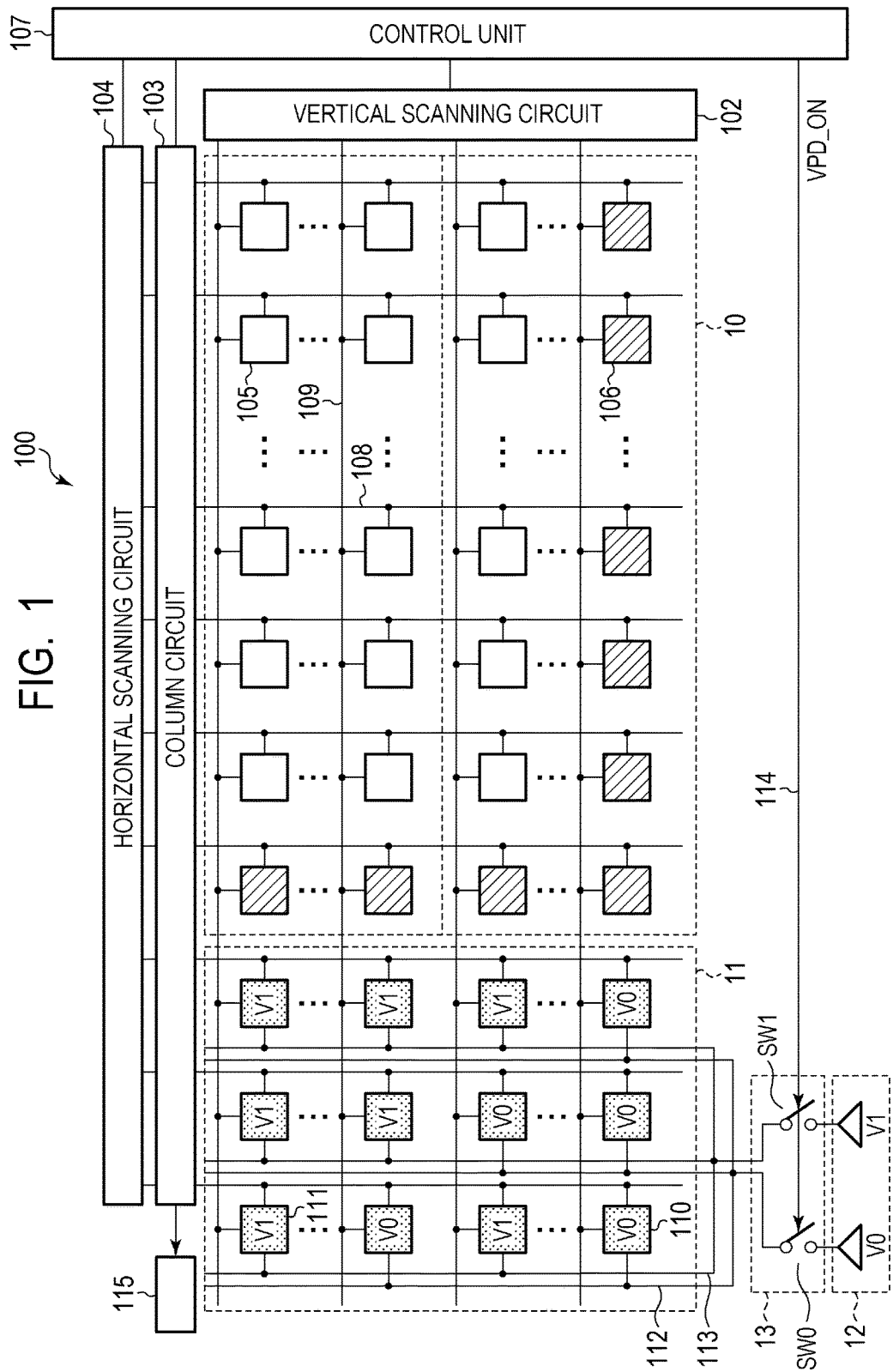
FIG. 1 is a block diagram illustrating a general configuration of a solid-state imaging device according to a first embodiment of the present invention.
Figure 2:
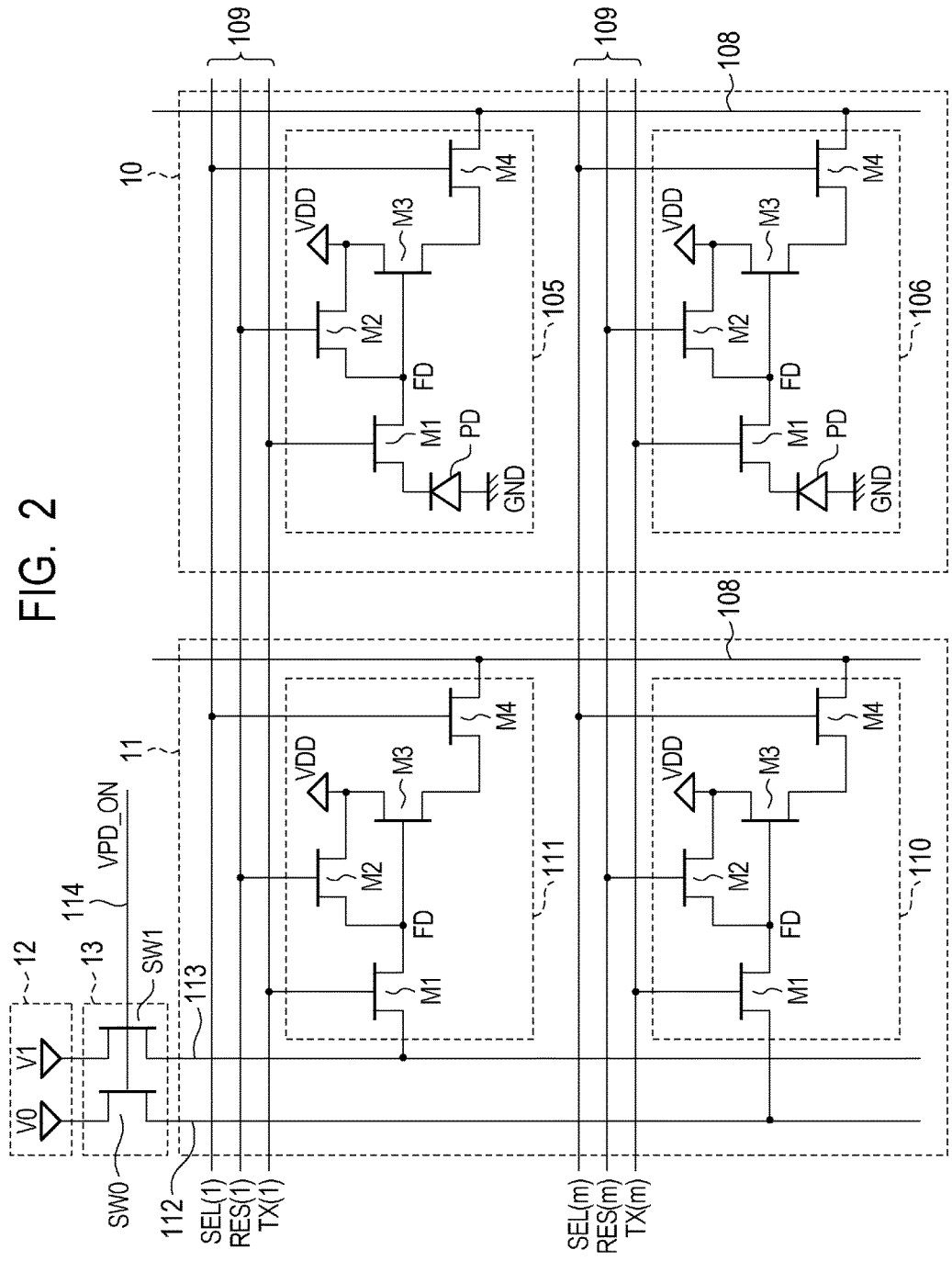
FIG. 2 is a circuit diagram illustrating an example configuration of pixels in the solid-state imaging device according to the first embodiment of the present invention.
Figure 3A:
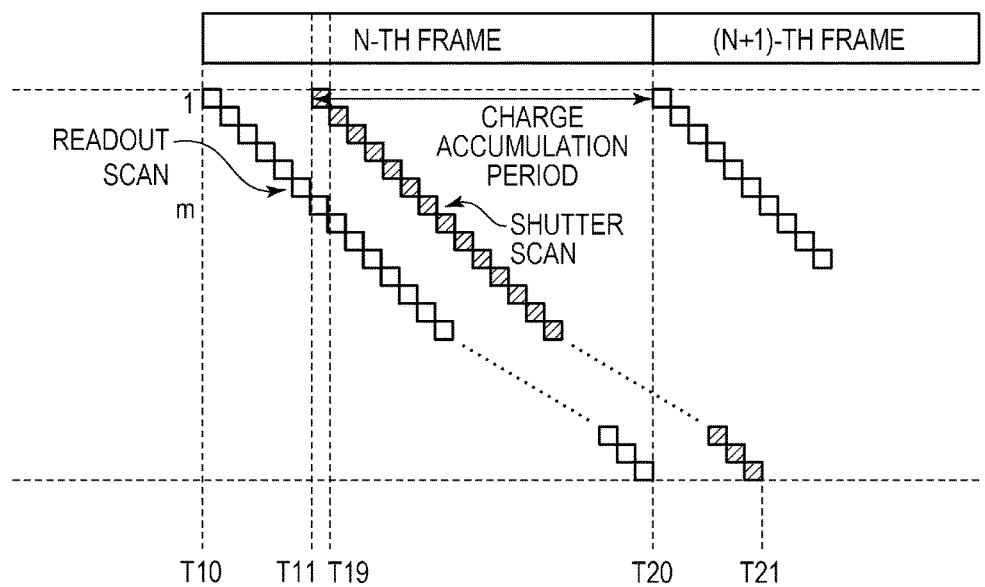
FIG. 3A and FIG. 3B are timing diagrams illustrating a method of driving the solid-state imaging device according to the first embodiment of the present invention.
Figure 3B:
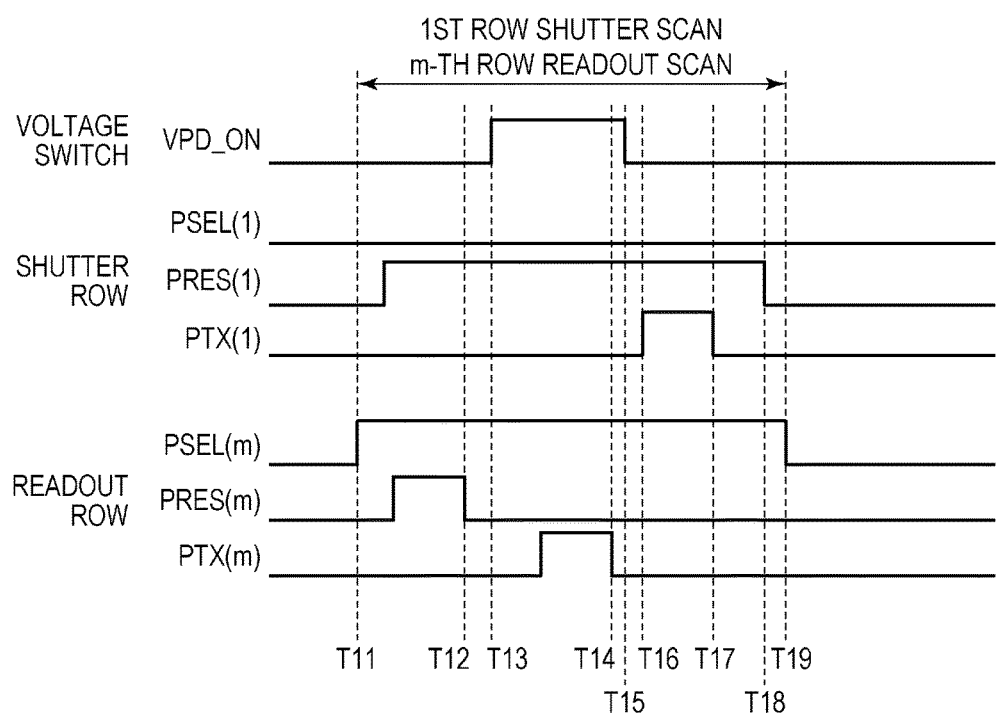

FIG. 1 is a block diagram illustrating a general configuration of the solid-state imaging device according to the present embodiment. FIG. 2 is a circuit diagram illustrating an example configuration of pixels in the solid-state imaging device according to the present embodiment. FIG. 3A and FIG. 3B are timing diagrams illustrating the method of driving the solid-state imaging device according to the present embodiment.

First, the structure of the solid-state imaging device according to the present embodiment will be described by using FIG. 1 and FIG. 2.

As illustrated in FIG. 1, a solid-state imaging device 100 according to the present embodiment includes a first region 10, a second region 11, a vertical scanning circuit 102, a column circuit 103, a horizontal scanning circuit 104, an output circuit 115, a control unit 107, a voltage supply unit 12, and a voltage switch 13.

In the first region 10, a first group of pixels 105 and a second group of pixels 106 are arranged over a plurality of rows and a plurality of columns. The first region 10 is a pixel region used for image acquisition in which pixels used for image acquisition (image acquisition pixels) are arranged. Each of the pixels 105 is a pixel including a photoelectric converter and is illustrated with a white block in FIG. 1. Each of the pixels 106 is a pixel including a light-shielded photoelectric converter and is illustrated with a diagonally hatched block in FIG. 1. Each of the pixels 106 is a pixel that outputs a reference signal that is the reference of a black level and typically arranged in the peripheral edge of the first region 10. Note that the pixels 106 may not necessarily be provided.

In the second region 11, a third group of pixels 110 and a fourth group of pixels 111 are arranged over a plurality of rows and a plurality of columns. The second region 11 is a pixel region used for failure detection in which pixels used for failure detection (detection pixels) are arranged. Each of the pixels 110 is a pixel that outputs a signal in accordance with a fixed voltage V0 and is illustrated with a block with inscribed "V0" in FIG. 1. Each of the pixels 111 is a pixel that outputs a signal in accordance with a fixed voltage V1 and is illustrated with a block with inscribed "V1" in FIG. 1.

The first region 10 and the second region 11 are arranged adjacent in the row direction (the horizontal direction in FIG. 1), and the first region 10 and the second region 11 are arranged in the same row but in different columns.

In each row of the first region 10 and the second region 11, a pixel control line 109 extending in the row direction is arranged. The pixel control line 109 on each row is a signal line common to the pixels 105, 106, 110, and 111 on the corresponding row. The pixel control lines 109 are connected to the vertical scanning circuit 102.

In each column of the first region 10 and the second region 11, a vertical output line 108 extending in the column direction is arranged. The vertical output line 108 on each column of the first region 10 is a signal line common to the pixels 105 and 106 on the corresponding column. The vertical output line 108 on each column of the second region 11 is a signal line common to the pixels 110 and 111 on the corresponding column. The vertical output lines 108 are connected to the column circuit 103.

The vertical scanning circuit 102 supplies predetermined control signals for driving the pixels 105, 106, 110, and 111 via the pixel control lines 109. Logic circuits such as a shift resistor, an address decoder, or the like may be used for the vertical scanning circuit 102. While FIG. 1 depicts the pixel control line 109 on each row as a single signal line, a plurality of control signal lines are included in an actual implementation. The pixels 105, 106, 110, and 111 on a row selected by the vertical scanning circuit 102 operate to simultaneously output signals to the associated vertical output lines 108.

The column circuit 103 amplifies pixel signals output to the vertical output lines 108 and performs a correlated double sampling process on the amplified pixel signals based on a signal at reset operation and a signal at photoelectric conversion. On the pixel signals output from the pixels 110 and 111 used for failure detection, a correlated double sampling process based on a signal at reset operation and a signal at input operation of a fixed voltage in a similar manner to the process of the pixels 105 and 106 used for image acquisition.

The horizontal scanning circuit 104 supplies, to the column circuit 103, control signals for transferring pixel signals processed in the column circuit 103 to the output circuit 115 sequentially on a column basis.

The output circuit 115 is formed of a buffer amplifier, a differential amplifier, or the like and outputs, to a signal processing unit (not illustrated) outside the solid-state imaging device 100, a pixel signal transferred from the column circuit 103. Note that an AD conversion unit may be provided to the column circuit 103 or the output circuit 115 to output a digital image signal to the outside.

The voltage supply unit 12 is a power source circuit that supplies predetermined voltages, for example, the fixed voltages V0 and V1. The voltage switch 13 is a switch that switches a conductive state and a non-conductive state of an electrical path between the voltage supply unit 12 and the pixels 110 and 111 of the second region 11 and includes switches SW0 and SW1. The switch SW0 is provided between a supply terminal of the fixed voltage V0 of the voltage supply unit 12 and a voltage supply line 112 and supplies the fixed voltage V0 to the voltage supply line 112 in accordance with a control signal (VPD_ON) supplied from the control unit 107 via a control signal line 114. The switch SW1 is provided between a supply terminal of the fixed voltage V1 of the voltage supply unit 12 and a voltage supply line 113 and supplies the fixed voltage V1 to the voltage supply line 113 in accordance with a control signal (VPD_ON) supplied from the control unit 107 via a control signal line 114.

The voltage supply lines 112 and 113 are interconnections for supplying the fixed voltages V0 and V1 from the voltage supply unit 12 to the pixels 110 and 111 arranged in the second region 11. In the plurality of pixels 110 and 111 within the second region 11, the voltage supply lines 112 and 113 are shared as depicted, for example, which allows for a reduction of the circuit.

In the second region 11, the pixels 110 to which the fixed voltage V0 is supplied and the pixels 111 to which the fixed voltage V1, which is different from the fixed voltage V0, is supplied are arranged in a matrix according to a particular pattern.

In a case where the second region 11 is formed of three columns, for example, the pixels 110, 110 and 110 are arranged on each column on one row (the lowermost row in FIG. 1, for example). Further, the pixels 111, 110 and 111 are arranged on each column on another row (the second row from the bottom in FIG. 1, for example). That is, the pattern of the fixed voltages applied to the pixels 110 and 111 is different in accordance with the row for the vertical scanning.

The pixel control line 109 is shared by the pixels 110 and 111 used for failure detection and the pixels 105 and 106 used for image acquisition which all belong to the same row. Therefore, by collating the output pattern in the second region 11 with an expected value, it is possible to detect whether the vertical scanning circuit 102 is operating normally or is scanning a row different from the expectation due to a failure.

Note that, while the case where the second region 11 is formed of three columns is exemplified in the present embodiment, the number of columns that form the second region 11 is not limited to three.

FIG. 2 is a circuit diagram illustrating an example configuration of the pixels 105, 106, 110, and 111 of the first region 10 and the second region 11. In FIG. 2, the pixel 105 arranged on the first row and the pixel 106 arranged on the m-th row are extracted from one column of the first region 10, and the pixel 111 arranged on the first row and the pixel 110 arranged on the m-th row are extracted from one column of the second region 11. Note that the circuit configuration of the pixel 105 is the same as the circuit configuration of the pixel 106.

Each of the pixels 105 and 106 arranged in the first region 10 includes a photoelectric converter PD, a transfer transistor M1, a reset transistor M2, an amplifier transistor M3, and a select transistor M4. The photoelectric converter PD is a photodiode, for example. The anode of the photodiode of the photoelectric converter PD is connected to a reference voltage terminal GND, and the cathode thereof is connected to the source of the transfer transistor M1. The drain of the transfer transistor M1 is connected to the source of the reset transistor M2 and the gate of the amplifier transistor M3. The connection node of the drain of the transfer transistor M1, the source of the reset transistor M2, and the gate of the amplifier transistor M3 forms a floating diffusion FD. The drain of the reset transistor M2 and the drain of the amplifier transistor M3 are connected to a power source voltage terminal VDD. The source of the amplifier transistor M3 is connected to the drain of the select transistor M4. The source of the select transistor M4 is connected to the vertical output line 108.

The pixel 110 arranged in the second region 11 includes a transfer transistor M1, a reset transistor M2, an amplifier transistor M3, and a select transistor M4. The source of the transfer transistor M1 is connected to the voltage supply line 112. The drain of the transfer transistor M1 is connected to the source of the reset transistor M2 and the gate of the amplifier transistor M3. The connection node of the drain of the transfer transistor M1, the source of the reset transistor M2, and the gate of the amplifier transistor M3 forms a floating diffusion FD. The drain of the reset transistor M2 and the drain of the amplifier transistor M3 are connected to the power source voltage terminal VDD. The source of the amplifier transistor M3 is connected to the drain of the select transistor M4. The source of the select transistor M4 is connected to the vertical output line 108.

The pixel 111 arranged in the second region 11 is similar to the pixel 110 except that the source of the transfer transistor M1 is connected to the voltage supply line 113 instead of the voltage supply line 112.

In the case of the pixel configuration of FIG. 2, the pixel control line 109 arranged on each row includes signal lines TX, RES, and SEL. Each of the signal lines TX is connected to the gates of the transfer transistors M1 of the pixels 105, 106, 110, and 111 belonging to the associated row. Each of the signal lines RES is connected to the gates of the reset transistors M2 of the pixels 105, 106, 110, and 111 belonging to the associated row, respectively. Each of the signal lines SEL is connected to the gates of the select transistors M4 of the pixels 105, 106, 110, and 111 belonging to the associated row, respectively. Note that, in FIG. 2, the row number is added to each reference symbol of the signal lines (for example, SEL(1), RES(m)).

A control signal PTX, which is the drive pulse for controlling the transfer transistor M1, is output to the signal line TX from the vertical scanning circuit 102. A control signal PRES, which is the drive pulse for controlling the reset transistor M2, is output to the signal line RES from the vertical scanning circuit 102. A control signal PSEL, which is the drive pulse for controlling the select transistor M4, is output to the signal line SEL from the vertical scanning circuit 102. When each transistor is formed of an n-channel transistor, the related transistor is turned on when a high-level control signal is supplied from the vertical scanning circuit 102, and the related transistor is turned off when a low-level control signal is supplied from the vertical scanning circuit 102.

The photoelectric converter PD converts (photoelectrically converts) an incident light into charges whose amount is in accordance with the light amount of the incident light and accumulates the generated charges. When turned on, the transfer transistors M1 of the pixels 105 and 106 transfer the charges of the photoelectric converter PD to the floating diffusion FD. The floating diffusion FD is set to a voltage in accordance with the amount of charges transferred from the photoelectric converter PD by charge-to-voltage conversion according to the capacitance component of the floating diffusion FD. When turned on, the transfer transistors M1 of the pixels 110 and 111 apply, to the floating diffusion FD, voltages supplied from the voltage supply lines 112 and 113. The amplifier transistor M3 is configured such that the drain thereof is supplied with the power source voltage and the source thereof is supplied with a bias current from a current source (not illustrated) via the select transistor M4, and thereby an amplification unit (a source follower circuit) whose gate is an input node is configured. This causes the amplifier transistor M3 to output a signal based on the voltage of the floating diffusion FD to the vertical output line 108 via the select transistor M4. When turned on, the reset transistor M2 resets the floating diffusion FD to a voltage in accordance with the power source voltage VDD.

With respect to the pixels 105, 106, 110, and 111 on the same row, the common control signals PTX, PRES, and PSEL are supplied to the first region 10 and the second region 11 from the vertical scanning circuit 102. For example, the control signals PTX(m), PSEL(m), and PRES(m) are supplied to the transfer transistor M1, the reset transistor M2, and the select transistor M4, respectively, of the pixels 105, 106, 110, and 111 on the m-th row.

Next, the method of driving the solid-state imaging device according to the present embodiment will be described by using FIG. 3A and FIG. 3B. FIG. 3A is a timing diagram illustrating the relationship between readout scan and shutter scan in one frame period. FIG. 3B is a timing diagram illustrating details of the operation of pixels in the scan of a readout scan row and a shutter scan row.

FIG. 3A schematically illustrates the operation of the N-th frame that starts at the time T10 and ends at the time T20 and the (N+1)-th frame that starts at the time T20. The operation of each frame includes readout scan in which readout operations from the pixels 105, 106, 110, and 111 are sequentially performed on a row basis and shutter scan in which charge accumulation operations to the photoelectric converters PD of the pixels 105 and 106 are sequentially started on a row basis.

The readout scan of the N-th frame starts at the time T10 and ends at the time T20. The time T10 is the start time of the readout operation from the pixels 105, 106, 110, and 111 on the first row, and the time T20 is the end time of the readout operation from the pixels 105, 106, 110, and 111 on the last row.

The shutter scan of the N-th frame starts at the time T11 and ends at the time T21. The time T11 is the start time of the shutter operation in the pixels 105 and 106 on the first row, and the time T21 is the end time of the shutter operation in the pixels 105 and 106 on the last row. A period from the start time of the shutter operation to the start time of the next readout operation is a charge accumulation period. For example, when focusing on the first row, the period from the time T11 to the time T20 is a charge accumulation period. By controlling the start time of the shutter operation, it is possible to control the charge accumulation period.

It is assumed here that the readout operation from the pixels 105, 106, 110, and 111 on the m-th row starts at the time T11 at which the shutter operation of the pixels 105 and 106 on the first row starts. The shutter operation of the pixels 105 and 106 on the first row and the readout operation from the pixels 105, 106, 110, and 111 on the m-th row end at the time T19.

FIG. 3B illustrates details of the operation of the pixels 105, 106, 110, and 111 from the time T11 to the time T19. Note that the operations of the pixels 105, 106, 110, and 111 are the same as each other in the shutter operation and are the same as each other in the readout operation.

At the time T11, the control signal PSEL(m) of the readout scan row (the m-th row) becomes a high level, and the select transistors M4 of the pixels 105, 106, 110, and 111 on the readout scan row are turned on. This operation results in a state where the readout of signals from the pixels 105, 106, 110, and 111 on the readout scan row to the vertical output line 108 is enabled.

Next, between the time T11 and the time T12, the control signal PRES(1) of the shutter scan row (first row) and the control signal PRES (m) of the readout scan row become a high level. This operation causes the reset transistors M2 of the pixels 105, 106, 110, and 111 on the shutter scan row and the readout scan row to be turned on, and the floating diffusion FD is reset.

Next, at the time T12, the control signal PRES(m) of the readout scan row becomes a low level, and the reset transistors M2 of the pixels 105, 106, 110, and 111 on the readout scan row are turned off. This operation causes charges present in the floating diffusion FD to be drained to the power source voltage terminal VDD, and the voltage of the floating diffusion FD is amplified by the source follower operation and read out to the vertical output line 108.

Next, at the time T13, the control signal VPD_ON becomes a high level and thereby the switches SW0 and SW1 of the voltage switch 13 are turned on, and the fixed voltages V0 and V1 are supplied to the voltage supply lines 112 and 113 from the voltage supply unit 12, respectively.

Next, between the time T13 and the time T14, the control signal PTX(m) of the readout scan row becomes a high level, and the transfer transistors M1 of the pixels 105, 106, 110, and 111 on the readout scan row are turned on. This operation causes charges accumulated in the photoelectric converters PD to be transferred to the floating diffusions FD in the pixels 105 and 106 on the readout scan row. Further, in the pixels 110 and 111 on the readout scan row, the fixed voltages V0 and V1 supplied from the voltage supply unit 12 are written to the floating diffusions FD.

Next, at the time T14, the control signal PTX(m) of the readout scan row becomes a low level, the transfer transistors M1 of the pixels 105, 106, 110, and 111 on the readout scan row are turned off. This operation causes the voltages of the floating diffusions FD on the readout scan row to be fixed, and the fixed voltage is amplified by a source follower operation and read out to the vertical output line 108.

Next, at the time T15, the control signal VPD_ON becomes a low level and thereby the switches SW0 and SW1 of the voltage switch 13 are turned off, which stops the supply of the fixed voltages V0 and V1 to the voltage supply lines 112 and 113 from the voltage supply unit 12.

Next, at the time T16, the control signal PTX(1) of the shutter scan row becomes a high level, and the transfer transistors M1 of the pixels 105, 106, 110, and 111 on the shutter scan row are turned on. At this time, since the reset transistors M2 of the pixels 105, 106, 110, and 111 on the shutter scan row are already turned on, the charges of the photoelectric converters PD are drained to the power source voltage terminal VDD via the transfer transistors M1 and the reset transistors M2.

Next, at the time T17, the control signal PTX(1) of the shutter scan row becomes a low level, and the transfer transistors M1 of the pixels 105, 106, 110, and 111 on the shutter scan row are turned off. Also, at the time T18, the control signal PRES(1) of the shutter scan row becomes a low level, and the reset transistors M2 of the pixels 105, 106, 110, and 111 on the shutter scan row are turned off. This operation causes the shutter operation of the shutter scan row to end.

Next, at the time T19, the control signal PSEL(m) of the readout scan row becomes a low level, and the select transistors M4 of the pixels 105, 106, 110, and 111 on the readout scan row are turned off. This operation causes selection of the pixels on the readout scan row to be cancelled, and the readout operation of the readout scan row ends.

In the present embodiment, as described above, the switches SW0 and SW1 of the voltage switch 13 are in an off-state (the control signal VPD_ON is in a low level) while the transfer transistors M1 of the shutter scan row are in an on-state. The reason for the above will be described below.

In order to completely remove charges of the photoelectric converters PD of the pixels 105 and 106 in the first region 10 through a shutter operation, it is desirable to simultaneously turn on the reset transistors M2 and the transfer transistors M1 on the shutter scan row. In particular, when the saturated charge amount of the photoelectric converter PD exceeds the saturated charge amount of the floating diffusion FD, it is essential that the reset transistor M2 and the transfer transistor M1 be simultaneously turned on.

However, if voltage supply from the voltage supply unit 12 to the pixels 110 and 111 of the second region 11 continued in this state, the fixed voltage terminals V1 and V0 and the power source voltage terminal VDD would be short-circuited. Typically, because the fixed voltage V1 is around 1.6 V and the power source voltage VDD is 3.3V, a flow of the short-circuit current may cause an adverse effect such as incorrect readout of the potentials of the pixels 110 and 111 of the second region 11.

To address this, the present embodiment is configured such that the voltage switch 13 is provided between the voltage supply unit 12 and the pixels 110 and 111 of the second region 11. Further, when the transfer transistors M1 on the shutter scan row are turned on, the switches SW0 and SW1 of the voltage switch 13 are driven to be turned off. This avoids a short-circuit of the fixed voltage terminals V0 and V1 and the power source voltage terminal VDD at the time of shutter scan and allows for a higher detection accuracy of failure detection. That is, by avoiding a short-circuit among the voltage terminals at the time of shutter scan, an advantage of increasing the detection accuracy of failure detection can be obtained while performing capturing and failure detection in a real-time manner.

Note that, in the present embodiment, although the timing of turning on the transfer transistors M1 on the shutter scan row is later than the timing of turning on the transfer transistors M1 on the readout scan row, the embodiment is not necessarily limited to such an operation. That is, the timing of turning on the transfer transistors M1 on the shutter scan row may be earlier than the timing of turning on the transfer transistors M1 on the readout scan row.

As discussed above, according to the present embodiment, it is possible to perform capturing and failure detection simultaneously and prevent a short-circuit among voltage terminals to improve the detection accuracy of failure detection.

Second Embodiment

A solid-state imaging device and a method of driving the same according to a second embodiment of the present invention will be described by using FIG. 4. The same reference symbols are provided to components similar to those of the solid-state imaging device according to the first embodiment, and the description thereof will be omitted or simplified.

Figure 4:
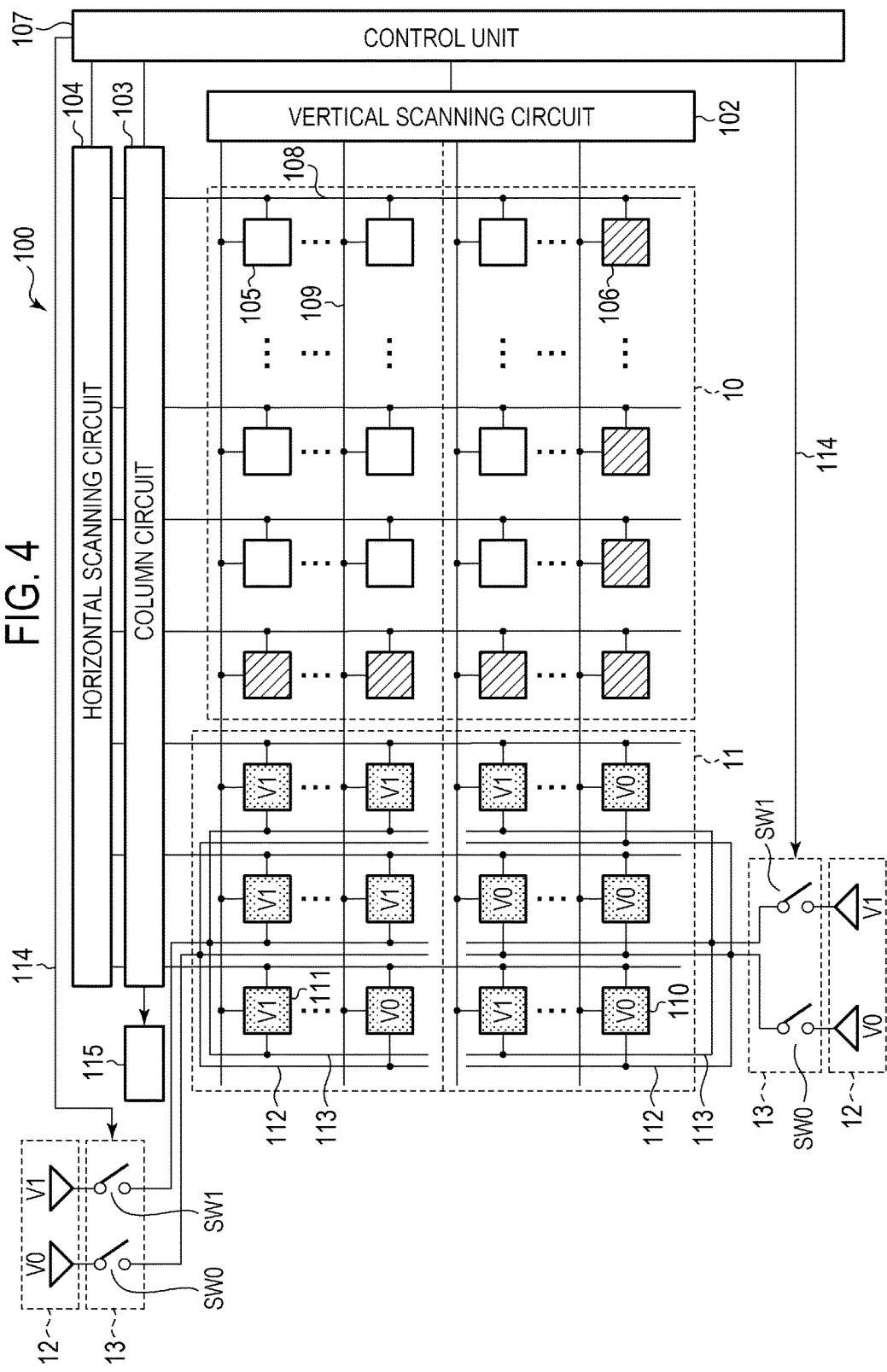
FIG. 4 is a block diagram illustrating a general configuration of a solid-state imaging device according to a second embodiment of the present invention.

FIG. 4 is a block diagram illustrating a schematic configuration of a solid-state imaging device according to the present embodiment.

The solid-state imaging device 100 according to the present embodiment includes two sets of the voltage supply unit 12 and the voltage switch 13. One of the two sets of the voltage supply unit 12 and the voltage switch 13 supplies the fixed voltages V0 and V1 to one group of the pixels 110 and 111 of the second region 11, such as the pixels 110 and 111 belonging to rows of the upper half part of the second region 11, for example. The other of the two sets of the voltage supply unit 12 and the voltage switch 13 supplies the fixed voltages V0 and V1 to the other group of the pixels 110 and 111 of the second region 11, such as the pixels 110 and 111 belonging to rows of the lower half part of the second region 11, for example. The two voltage switches 13 may be simultaneously controlled by a single control signal VPD_ON or may be separately controlled by different control signals VPD_ON in accordance with rows to be driven.

This can enhance the capability of voltage supply to the second region 11, which can further enhance the accuracy of failure detection while avoiding occurrence of a short-circuit among power source terminals at the time of shutter scan.

Note that, although two voltage supply units 12 are provided in the present embodiment, the number of the voltage supply unit 12 may be one. In this case, the fixed voltages V0 and V1 are supplied to the two voltage switches 13 from the single voltage supply unit 12. Further, three or more sets of the voltage supply units 12 and the voltage switches 13 may be provided.

As discussed above, the solid-state imaging device according to the present embodiment can prevent a short-circuit among the voltage terminals to improve the detection accuracy of failure detection while simultaneously performing capturing and failure detection. Further, the pixels belonging to the second region are divided into a plurality of groups, and the voltage supply unit and the voltage switch are provided to each group, which can enhance the capability of voltage supply to the pixels used for failure detection.

Third Embodiment

A solid-state imaging device and a method of driving the same according to a third embodiment of the present invention will be described by using FIG. 5 to FIG. 6B. The same reference symbols are provided to components similar to those of the solid-state imaging device according to the first and second embodiments, and the description thereof will be omitted or simplified.

FIG. 5 is a block diagram illustrating a general configuration of a solid-state imaging device according to the present embodiment. FIG. 6A and FIG. 6B are diagrams illustrating an example configuration of a voltage switch in the solid-state imaging device according to the present embodiment.

The solid-state imaging device 100 according to the present embodiment is different from the solid-state imaging device according to the first embodiment in that two voltage switches 13 are provided to one voltage supply unit (first difference). Further, there is a difference from the solid-state imaging device of the first embodiment in that the voltage switch 13 has not only the function of turning on/off the supply of the fixed voltages V0 and V1 but also a function of switching the fixed voltages V0 and V1 (voltage-switching function) (second difference).

In relation to the first difference described above, the solid-state imaging device of the present embodiment is configured such that the voltage switches 13 are arranged above and below the second region 11 and the fixed voltages V0 and V1 are supplied to the same voltage supply lines 112 and 113 from the upper and lower voltage switches 13. That is, the two voltage switches 13 connected in parallel are provided between the voltage supply unit 12 and the voltage supply lines 112 and 113. The configuration that supplies the voltage from both of the upper side and the lower side of the second region 11 has advantages of a reduction in delay of voltage stabilization after switching due to the interconnection capacitance and a reduction in an effect of voltage drop due to the interconnection resistance.

When the single voltage switch 13 is employed and when there is an open-circuit failure in the voltage switch 13, the fixed voltages V0 and V1 cannot be applied. However, when the two voltage switches 13 are employed, the fixed voltages V0 and V1 can be applied via the voltage switch 13 which is not failed. This allows for an advantage of not losing the function of the pixels 110 and 111 used for failure detection.

Note that, when it is sufficient to realize the advantage based on the first difference, each of the voltage switches 13 may be of the same configuration as that in the first embodiment.

Further, in relation to the second difference described above, the solid-state imaging device of the present embodiment is different from the solid-state imaging device of the first embodiment in the circuit configuration of the voltage switch 13.

In the present embodiment, the control signal VPD_SEL in addition to the control signal VPD_ON is used as a control signal supplied to the voltage switches 13 from the control unit 107. The voltage switch 13 is configured such that the fixed voltages V0 and V1 are output when the control signal VPD_ON is a high level and the fixed voltages V0 and V1 output to terminals Va and Vb are switched in accordance with the level of the control signal VPD_SEL at this time.

Figures 6A, 6B:
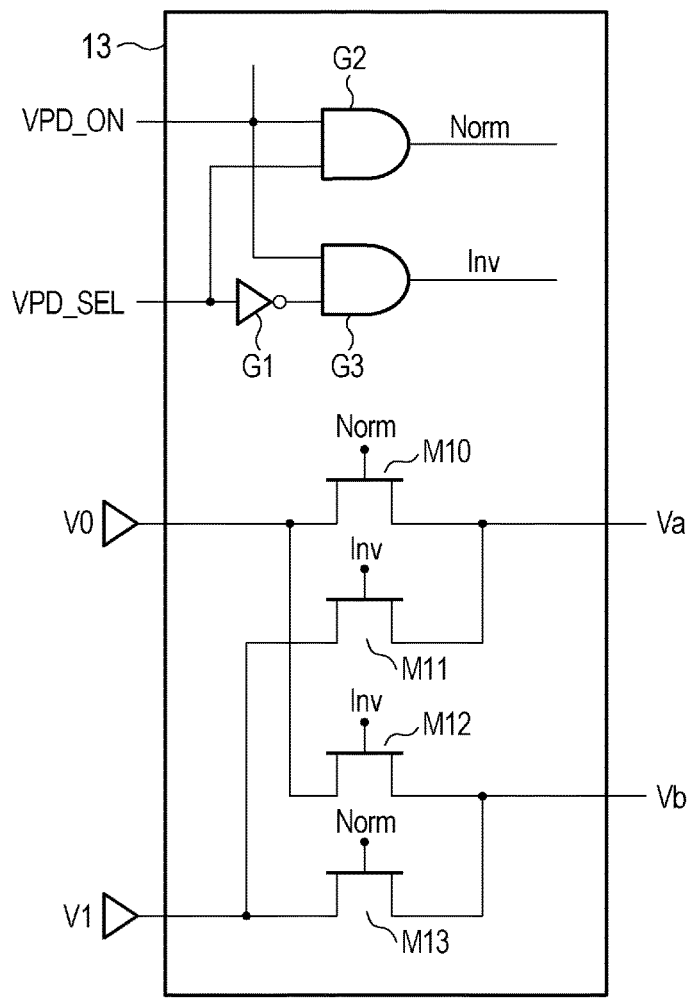
FIG. 6A and FIG. 6B are diagrams illustrating an example configuration of a voltage switch in the solid-state imaging device according to the third embodiment of the present invention.

Although the circuit that implements such an operation is not limited in particular, the circuit illustrated in FIG. 6A may be applied, for example. The voltage switch 13 illustrated in FIG. 6A is formed of a NOT gate G1, AND gates G2 and G3, and MOS transistors M10, M11, M12, and M13.

The fixed voltage V0 is supplied to the drains of the MOS transistors M10 and M12. The source of the MOS transistor M10 is connected to the drain of the MOS transistor M11.

The source of the MOS transistor M12 is connected to the drain of the MOS transistor M13. The fixed voltage V1 is supplied to the sources of the MOS transistors M11 and M13. The connection node of the source of the MOS transistor M10 and the drain of the MOS transistor M11 forms the terminal Va. The connection node of the source of the MOS transistor M11 and the drain of the MOS transistor M13 forms the terminal Vb.

The control signal VPD_ON is input to one of the input terminals of the AND gate G2 and one of the input terminals of the AND gate G3. The control signal VPD_SEL is input to the other input terminal of the AND gate G2 and the input terminal of the NOT gate G1. The output of the NOT gate is input to the other input terminal of the AND gate G3. An output signal Norm of the AND gate G2 is a control signal supplied to the gates of the MOS transistors M10 and M13. An output signal Inv of the AND gate G3 is a control signal supplied to the gates of the MOS transistors M11 and M12.

FIG. 6B is a truth table indicating the relationship between the control signals VPD_ON and VPD_SEL and the voltage output to the terminals Va and Vb in the circuit of FIG. 6A. As illustrated in FIG. 6B, when the control signal VPD_ON is a low level (0), the terminals Va and Vb are in a floating state regardless of the level of the control signal VPD_SEL. When the control signal VPD_ON is a high level (1) and the control signal VPD_SEL is a low level (0), the fixed voltage V0 is output from the terminal Va and the fixed voltage V1 is output from the terminal Vb. When the control signal VPD_ON is a high level (1) and the control signal VPD_SEL is a high level (1), the fixed voltage V1 is output from the terminal Va and the fixed voltage V0 is output from the terminal Vb.

As discussed above, by switching the signal level of the control signal VPD_SEL when the control signal VPD_ON is a high level, it is possible to provide two values of the fixed voltage V0 and the fixed voltage V1 to the same pixels 110 and 111.

For example, at the time of readout scan in a certain frame, the control signal VPD_SEL is set to a high level to drive the control signal VPD_ON as illustrated in FIG. 3B. Further, at the time of readout scan in another frame, the control signal VPD_SEL is set to a low level to drive the control signal VPD_ON as illustrated in FIG. 3B. This drive enables detection of a failure even in a failure mode which would otherwise cause false detection that identifies a failure as normal because the pixels 110 and 111 are accidentally fixed to a voltage close to the fixed voltage V0, for example.

As discussed above, the solid-state imaging device according to the present embodiment can prevent a short-circuit among the voltage terminals to improve the detection accuracy of failure detection while simultaneously performing capturing and failure detection. Further, by switching the fixed voltages supplied to the pixels used for the failure detection, it is possible to reduce a false that would otherwise identify a failure as a normal operation.

Fourth Embodiment

An imaging system and a movable object according to the fourth embodiment of the present invention will be described by using FIG. 7A to FIG. 8.

Figure 7A:
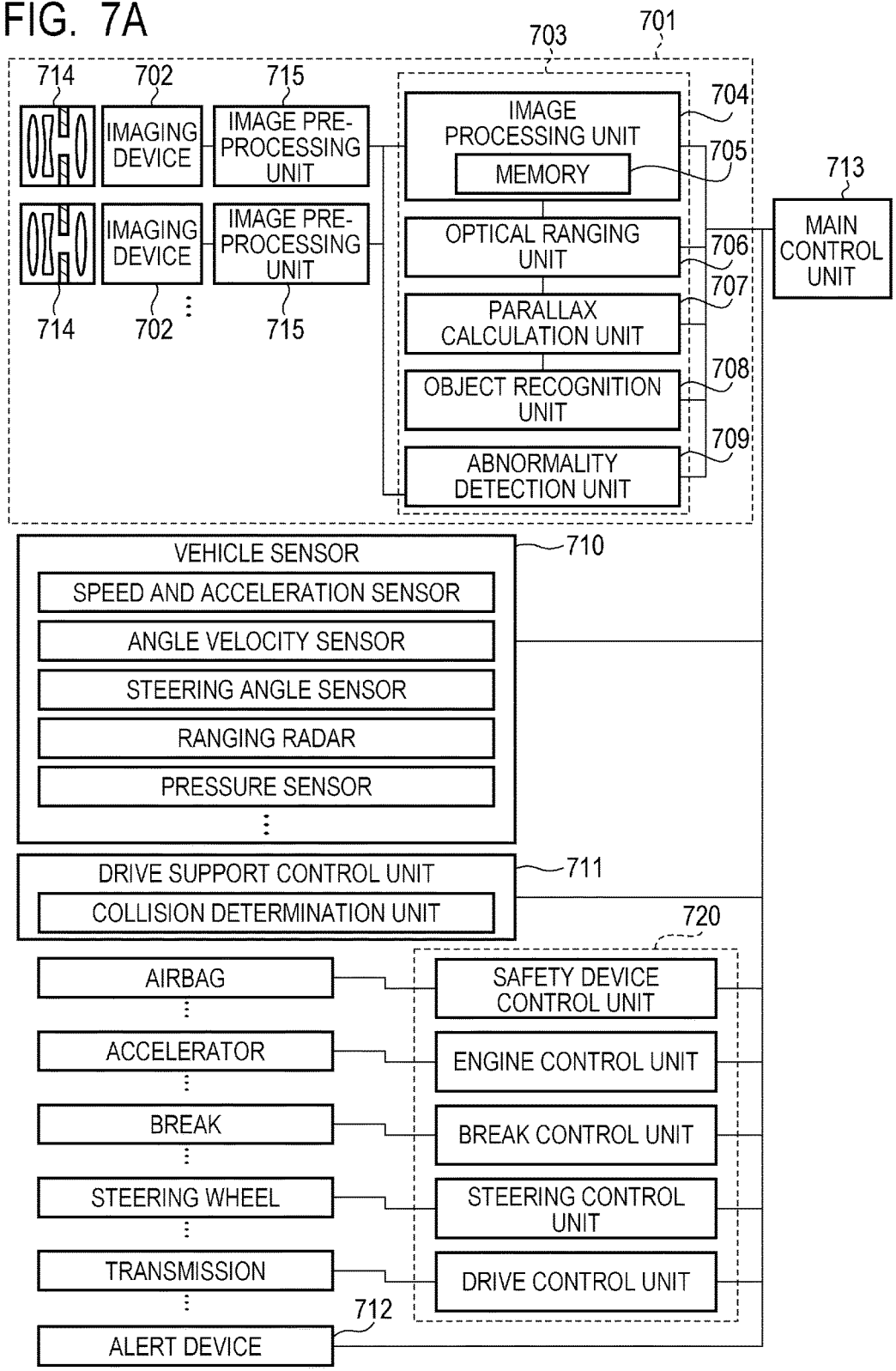
FIG. 7A is a schematic diagram illustrating an example configuration of an imaging system according to a fourth embodiment of the present invention.

FIG. 7A is a schematic diagram illustrating an example configuration of an imaging system according to the present embodiment. FIG. 7B is a schematic diagram illustrating an example configuration of a movable object according to the present embodiment. FIG. 8 is a flow diagram illustrating the operation of the imaging system according to the present embodiment.

In the present embodiment, an example of the imaging system related to an on-vehicle camera is illustrated. FIG. 7A and FIG. 7B illustrate an example of a vehicle system and the imaging system mounted thereon. The imaging system 701 includes an imaging device 702, an image pre-processing unit 715, an integrated circuit 703, and an optical system 714. The optical system 714 forms an optical image of an object on the imaging device 702. The imaging device 702 converts an optical image of an object formed by the optical system 714 into an electrical signal. The imaging device 702 is any of the solid-state imaging devices of the first to third embodiments described above. The image pre-processing unit 715 performs predetermined signal processing on a signal output from the imaging device 702. The function of the image pre-processing unit 715 may be embedded in the imaging device 702. At least two sets of the optical system 714, the imaging device 702, and the image pre-processing unit 715 are provided in the imaging system 701, and outputs from the image pre-processing unit 715 of respective sets are input to the integrated circuit 703.

The integrated circuit 703 is an application specific integrated circuit for the imaging system and includes an image processing unit 704 including a memory 705, an optical ranging unit 706, a parallax calculation unit 707, an object recognition unit 708, and an abnormality detection unit 709. The image processing unit 704 performs image processing such as development process, defect correction, or the like on the output signal from the image pre-processing unit 715. The memory 705 stores primary storage data of a captured image or a defection position of a captured image. The optical ranging unit 706 performs focusing or ranging of an object. The parallax calculation unit 707 calculates a parallax (a phase difference of parallax images) from a plurality of image data acquired by the plurality of imaging devices 702. The object recognition unit 708 recognizes an object such as an automobile, a road, a traffic sign, a person, or the like. In response to detection of an abnormality of the imaging device 702, the abnormality detection unit 709 reports the abnormality to a main control unit 713. Note that the report of an abnormality may be performed outward the vehicle system. For example, an abnormality may be reported to a wireless network connected to the vehicle system.

The integrated circuit 703 may be implemented by dedicatedly designed hardware, may be implemented by a software module, or may be implemented by the combination thereof. Further, the integrated circuit 703 may be implemented by a Field Programmable Gate Array (FPGA), an Application Specific Integrated Circuit (ASIC), or the like, or may be implemented by the combination thereof.

The main control unit 713 organizes and controls the operation of the imaging system 701, a vehicle sensor 710, a control unit 720, or the like. Note that such a method may be employed that the imaging system 701, the vehicle sensor 710, and the control unit 720 have separate communication interfaces without the main control unit 713 and transmit and receive control signals respectively via the communication network (for example, CAN specification).

The integrated circuit 703 has a function of transmitting a control signal or a setting value to the imaging device 702 in response to receiving the control signal from the main control unit 713 or by using a control unit of the integrated circuit 703. For example, the integrated circuit 703 transmits a setting for pulse-driving the voltage switch 13 in the imaging device 702, a setting for switching the voltage switches 13 on a frame basis, or the like.

The imaging system 701 is connected to the vehicle sensor 710 and can sense a traveling state of the vehicle, such as a vehicle speed, a yaw rate, a steering angle, or the like, and a state of an environment outside the vehicle or another vehicle and an obstacle. The vehicle sensor 710 also serves as a distance information acquisition unit that acquires information on the distance from the parallax image to the object. Further, the imaging system 701 is connected to a drive support control unit 711 that performs various drive supports such as steering, patrol, collision prevention function, or the like. In particular, with respect to the collision prevention function, collision estimation and a collision against another vehicle and an obstacle is determined based on the sensing result of the imaging system 701 or the vehicle sensor 710. Thereby, avoidance control when a collision is estimated or startup of a safety device at a collision is performed.

Further, the imaging system 701 is connected to an alert device 712 that issues an alert to a driver based on the determination result in a collision determination unit. For example, when the determination result of the collision determination unit indicates a high possibility of collision, the main control unit 713 performs vehicle control to avoid a collision or reduce damage by applying a break, moving back the accelerator pedal, suppressing the engine power, or the like. The alert device 712 performs an alert to a user by sounding an alert such as a sound, displaying alert information on a display unit such as a car navigation system, a meter panel, or the like, providing a vibration to a seat belt or a steering wheel.

In the present embodiment, the surrounding area of the vehicle, for example, the area in front or rear is captured by the imaging system 701. FIG. 7B illustrates an example arrangement of an imaging system 701 when the area in front of the vehicle is captured by the imaging system 701.

Two imaging devices 702 are arranged in the front of the vehicle 700. Specifically, in terms of acquisition of the distance information or determination of the possibility of collision between the vehicle 700 and the captured object, it is preferable to define the center line with respect to the traveling direction or the external shape (for example, the vehicle width) of the vehicle 700 as a symmetry axis and arrange the two imaging devices 702 in a symmetrical manner with respect to the symmetry axis. Further, it is preferable to arrange the imaging devices 702 so as not to block the driver's field of view when the driver views the surroundings outside the vehicle 700 out of the driver seat. It is preferable to arrange the alert device 712 so as to be easily viewed by the driver.

Next, the failure detection operation of the imaging device 702 in the imaging system 701 will be described by using FIG. 8. The failure detection operation of the imaging device 702 is performed according to steps S810 to S880 illustrated in FIG. 8.

Step S810 is a step of performing setting at startup of the imaging devices 702. That is, a setting for the operation of the imaging devices 702 is transmitted from the outside of the imaging system 701 (for example, the main control unit 713) or the inside of the imaging system 701 to start a capturing operation and a failure detection operation of the imaging devices 702. The setting for the operation of the imaging devices 702 includes a setting for control of the voltage switch 13.

Next, at step S820, signals from the pixels 105 and 106 of the first region 10 belonging to a scanning row are acquired.

Further, at step S830, output values from the pixels 110 and 111 of the second region 11 belonging to the scanning row are acquired. Note that step S820 and step S830 may be exchanged.

Next, at step S840, classification is performed between output expectation values of pixels 110 and 111 based on connection settings of the fixed voltages V0 and V1 to the pixels 110 and 111 and the actual output values from the pixels 110 and 111.

As a result of the classification at step S840, when the output expectation values and the actual output values are matched, step S850 is entered to determine that the capturing operation in the first region 10 is normally performed, and step S860 is entered. At step S860, pixel signals on the scanning rows are transmitted to the memory 705 and temporarily saved therein. The process then returns to step S820 and continues the failure detection operation.

On the other hand, as a result of the classification at step S840, when the output expectation values and the actual output values are not matched, step S870 is entered to determine that there is an abnormality in the capturing operation in the first region 10, and reports an alert to the main control unit 713 or the alert device 712. The alert device 712 causes the display unit to display that an abnormality has been detected. The imaging devices 702 are then stopped at step S880 to end the operation of the imaging system 701.

Note that, although an example in which the flowchart is looped on a row basis has been illustrated in the present embodiment, the flowchart may be looped on a multiple-row basis, or the failure detection operation may be performed on a frame basis.

Further, although control for avoiding a collision to another vehicle has been illustrated in the present embodiment, the embodiment is applicable to driving control for following another vehicle, driving control for not going out of a traffic lane, or the like. Furthermore, the imaging system 701 is not limited to a vehicle such as the subject vehicle, and can be applied to a movable object (moving apparatus) such as a ship, an airplane, or an industrial robot, for example. In addition, the imaging system 701 can be widely applied to a device which utilizes object recognition, such as an intelligent transportation system (ITS), without being limited to movable objects.

Modified Embodiment

The present invention is not limited to the above-described embodiments, and various modifications are possible.

For example, the embodiments of the present invention include an example in which a part of the configuration of one of the embodiments is added to another embodiment or an example in which a part of the configuration of one of the embodiments is replaced with a part of the configuration of another embodiment.

Further, although the description has been provided in the above-described embodiment for the case where each transistor of the pixels 105, 106, 110, and 111 is formed of an n-channel transistor, each transistor of the pixels 105, 106, 110, and 111 may be formed of a p-channel transistor. In this case, the signal level of each drive signal in the above description is inverted.

Further, each circuit configuration of the pixels 105, 106, 110, and 111 is not limited to that illustrated in FIG. 2, and can be properly changed. For example, each of the pixels 105, 106, 110, and 111 may have the dual pixel structure having two photoelectric converters for a single pixel.

Figure 8:
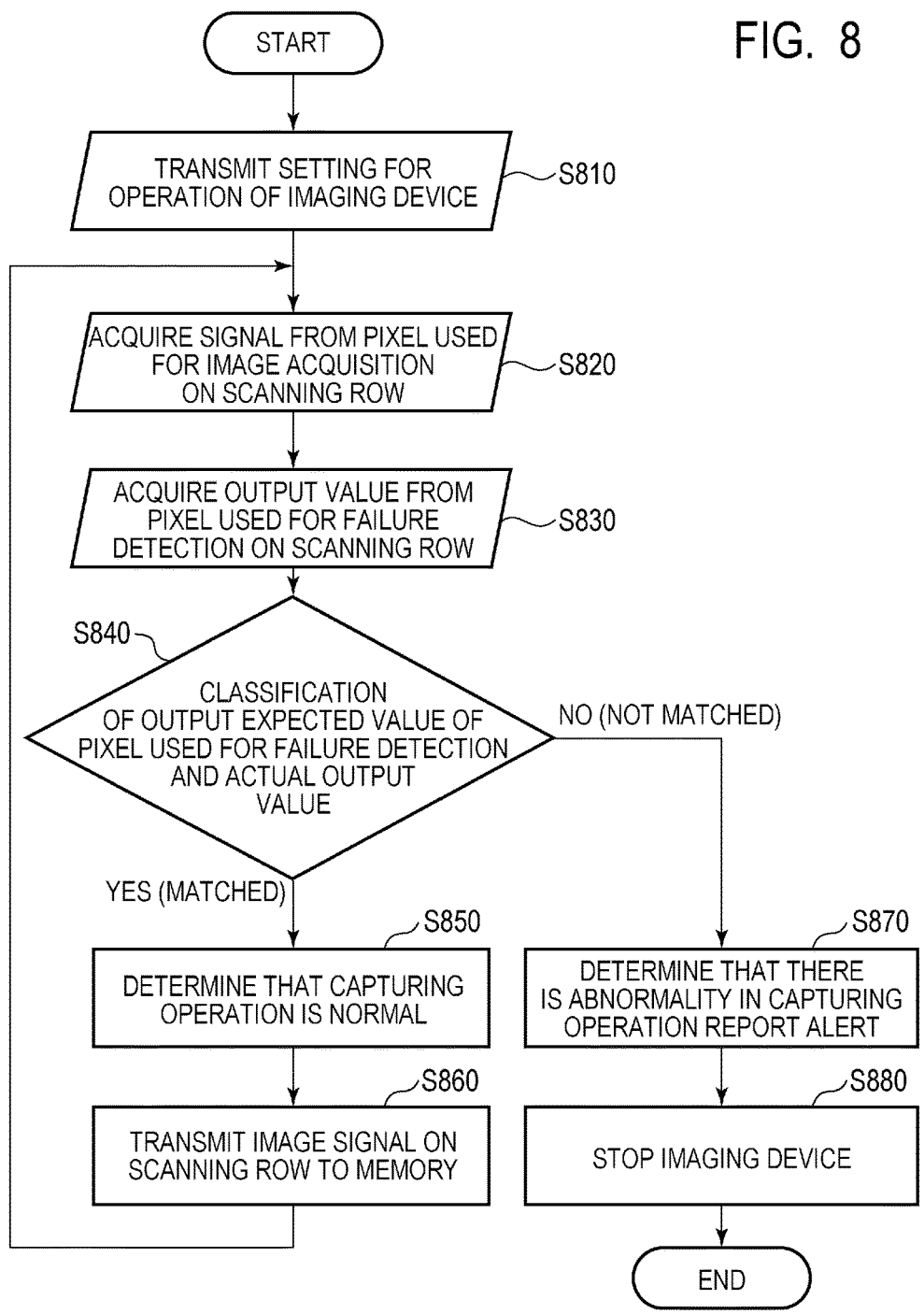
FIG. 8 is a flow diagram illustrating the operation of the imaging system according to the fourth embodiment of the present invention.

Further, while the imaging system illustrated in the fourth embodiment has been illustrated as an example imaging system to which the solid-state imaging device of the present invention can be applied, the imaging system to which the solid-state imaging device of the present invention can be applied is not limited to the configuration illustrated in FIG. 7A and FIG. 8. For example, the solid-state imaging devices described in the above first to third embodiments can be applied to a digital still camera, a digital camcorder, a surveillance camera, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-194564, filed Sep. 30, 2016, which is hereby incorporated by reference herein in its entirety.

What is claimed is:

1. A solid-state imaging device comprising:
    a first detection pixel, a second detection pixel and a third detection pixel, each of the first, second and third detection pixels including a transfer transistor and an amplifier transistor connected to the transfer transistor via a first node;
    a voltage supply unit that supplies a first voltage of a first value, and second voltage of a second value different from the first value;
    a first voltage supply line connected to the first detection pixel and the second detection pixel, and configured to supply one of the first voltage and the second voltage in a predetermined period;
    a second voltage supply line connected to the third detection pixel, and configured to supply the other one of the first voltage and the second voltage in the predetermined period;
    a first connection switch;
    a second connection switch; and
    an image acquisition pixel including a photoelectric converter configured to perform a photoelectric conversion based on an incident light, an amplifier transistor, and a transfer transistor connected to the amplifier transistor and the photoelectric converter,
    wherein the transfer transistor of the first detection pixel includes a gate connected to a first control line, and is configured to switch a conductive state and a non-conductive state between the first voltage supply line and the first node of the first detection pixel,
    wherein the transfer transistor of the second detection pixel is configured to switch a conductive state and a non-conductive state between the first voltage supply line and the first node of the second detection pixel,
    wherein the transfer transistor of the third detection pixel includes a gate connected to the first control line, and is configured to switch a conductive state and a non-conductive state between the second voltage supply line and the first node of the third detection pixel,
    wherein the first connection switch is connected between the voltage supply unit and the first voltage supply line,
    wherein the second connection switch is connected between the voltage supply unit and the second voltage supply line, and
    wherein the transfer transistor of the image acquisition pixel includes a gate connected to the first control line.

2. The solid-state imaging device according to claim 1 further comprising a controller,
    wherein the image acquisition pixel includes a reset transistor,
    wherein the transfer transistor, the amplifier transistor, and the reset transistor of the image acquisition pixel are connected to a third node, and
    wherein the controller sets the first connection switch and the second connection switch to an off-state in a period in which both of the transfer transistor of the image acquisition pixel and the reset transistor of the image acquisition pixel are in an on-state.

3. The solid-state imaging device according to claim 2 further comprising:
    a pixel region in which a plurality of pixels including a plurality of the first detection pixels, a plurality of the second detection pixels, a plurality of the third detection pixels, and a plurality of the image acquisition pixels are arranged over a plurality of rows and a plurality of columns,
    wherein the control line is provided on each row of the pixel region.

4. A movable object comprising:
    a solid-state imaging device according to claim 2;
    an integrated circuit comprising a distance information acquisition unit that acquires a distance information to an object in accordance with a parallax image based on the signal output from the image acquisition pixel; and
    a main control processor connected to the solid-state imaging device and the distance information acquisition unit that controls the movable object based on the distance information.

5. The movable object according to claim 4, wherein the integrated circuit further comprises an abnormality detection unit connected to the main control processor that performs comparison of the signals output from the first detection pixel and the second detection pixel with an expected value and detects an abnormality of the solid-state imaging device based on a result of the comparison.

6. The movable object according to claim 5, wherein the integrated circuit further comprises a notification unit connected to the main control processor that notifies toward an outside of the movable object that the abnormality is detected.

7. The movable object according to claim 5 further comprising a display unit,
    wherein the display unit displays that the abnormality is detected.

8. The solid-state imaging device according to claim 1, wherein the voltage supply unit selects the predetermined voltage out of a plurality of voltages having different values.

9. The solid-state imaging device according to claim 1,
    wherein the device includes a plurality of detection pixels including a plurality of first detection pixels, a plurality of second detection pixels, and a plurality of third detection pixels,
    wherein the plurality of detection pixels are divided into a plurality of groups,
    wherein each of the plurality of groups includes the first detection pixel and the second detection pixel as a part of the plurality of detection pixels,
    wherein the first voltage supply line is connected to the transfer transistor of each of the first and second detection pixels included in one group, and
    wherein the second voltage supply line is connected to the transfer transistor of each of the third detection pixels included in one group.

10. The solid-state imaging device according to claim wherein the device further includes a fourth detection pixel including a transfer transistor and an amplifier transistor connected to the transfer transistor via a first node, wherein the transfer transistor of the fourth detection pixel includes a gate connected to a second control line, and is configured to switch a conductive state and a non-conductive state between the second voltage supply line and the first node of the fourth detection pixel, and the gate of the transfer transistor of the second detection pixel is connected to the second control line.

11. The solid-state imaging device according to claim 1, wherein the first connection switch and the second connection switch are connected to a common control line.

12. The solid-state imaging device according to claim 1 further comprising:

a light shield pixel including a light-shielded photoelectric converter, wherein the light shield pixel is arranged between the image acquisition pixel and one of the first detection pixel, the second detection pixel, and the third detection pixel.

13. An imaging system comprising:

a solid-state imaging device according to claim 1; and an integrated circuit comprising an image processing unit connected to the solid-state imaging device that processes signals output from the solid-state imaging device.

14. The imaging system according to claim 13, wherein the integrated circuit further detects an abnormality of the solid-state imaging device based on a relationship between the signals output from the first detection pixel and the second detection pixel and an expected value by comparing the signals with the expected value.

15. A method of driving a solid-state imaging device including a voltage supply unit that supplies a predetermined voltage, a first detection pixel, a second detection pixel, an image acquisition pixel, a connection switch, and a control line, wherein the first detection pixel includes a first transfer transistor and a first reset transistor connected to the first transfer transistor, wherein the second detection pixel includes a second transfer transistor and a second reset transistor connected to the second transfer transistor, wherein the connection switch is connected between the voltage supply unit and a second node at which the first transfer transistor of the first detection pixel and the second transfer transistor of the second detection pixel are connected, wherein the image acquisition pixel includes a photoelectric converter, a third transfer transistor connected to the photoelectric converter, and a third reset transistor connected to the third transfer transistor, and wherein the control line is connected to a gate of the first transfer transistor and a gate of the third transfer transistor, the method comprising:

setting an electrical path between the voltage supply unit and the first transfer transistor to be non-conductive in at least a part of a period in which both of the first transfer transistor and the first reset transistor are turned on.

16. The method of driving a solid-state imaging device according to claim 15, wherein the solid-state imaging device includes a pixel region in which a plurality of pixels including a plurality of first detection pixels and a plurality of image acquisition pixels are arranged over a plurality of rows and a plurality of columns, and wherein, when performing shutter scan and readout scan on the plurality of rows of the pixel region sequentially on a row basis, a timing of turning on the third transfer transistor in resetting the photoelectric converter of the image acquisition pixel on a shutter scan row is different from a timing of turning on the second transfer transistor on a readout scan row, and a timing of turning on the second transfer transistor of the second detection pixel on a readout scan row overlaps with a timing of supplying the predetermined voltage to the second detection pixel.

17. The method of driving a solid-state imaging device according to claim 16, wherein the predetermined voltage to be supplied to the first detection pixel is switched on a frame basis.

* * * * *